United States Patent [19]
Hemphill et al.

[11] Patent Number: 6,167,448
[45] Date of Patent: Dec. 26, 2000

[54] MANAGEMENT EVENT NOTIFICATION SYSTEM USING EVENT NOTIFICATION MESSAGES WRITTEN USING A MARKUP LANGUAGE

[75] Inventors: John M. Hemphill; Richard Allen Stupek, Jr.; James A. Rozzi; Steven E. Fairchild, all of Harris County, Tex.

[73] Assignee: Compaq Computer Corporation, Houston, Tex.

[21] Appl. No.: 09/096,064

[22] Filed: Jun. 11, 1998

[51] Int. Cl.[7] ............................. G06F 15/173; G06F 15/16
[52] U.S. Cl. .......................... 709/224; 709/217; 709/219; 709/223; 709/230; 709/100; 707/501; 707/503; 712/28; 712/214; 712/216
[58] Field of Search ...................................... 709/202, 217, 709/219, 223, 224, 230, 200, 100; 707/501, 503; 706/50; 705/1; 712/28, 214, 216

[56] References Cited

U.S. PATENT DOCUMENTS

| | | | |
|---|---|---|---|
| 4,975,829 | 12/1990 | Clarey et al. | 395/500.45 |
| 5,430,845 | 7/1995 | Rimmer et al. | 709/301 |
| 5,475,836 | 12/1995 | Harris et al. | 709/301 |
| 5,522,042 | 5/1996 | Fee et al. | 709/226 |
| 5,559,958 | 9/1996 | Farrand et al. | 395/183.03 |
| 5,561,769 | 10/1996 | Kumar et al. | 709/202 |
| 5,572,195 | 11/1996 | Heller et al. | 340/825.35 |
| 5,581,478 | 12/1996 | Cruse et al. | 700/276 |
| 5,608,907 | 3/1997 | Fehskens et al. | 709/102 |
| 5,708,845 | 1/1998 | Wistendahl et al. | 345/302 |
| 5,862,325 | 1/1999 | Reed et al. | 709/201 |
| 5,870,549 | 2/1999 | Bobo, II | 709/206 |
| 5,884,312 | 3/1999 | Dunstan et al. | 707/10 |
| 5,960,176 | 9/1999 | Kuroki et al. | 709/223 |
| 5,983,190 | 1/1999 | Trower, II et al. | 704/276 |
| 6,049,805 | 4/2000 | Drucker et al. | 707/102 |

OTHER PUBLICATIONS

Ref: Newton's Telecom Dictionary, Newton, H., Flatiron Publishing, 14th Expanded and Updated Ed., Mar., 1998, (see XML).
Ref: Computer Dictionary, Redmond, WA, Microsoft Press, 3erd Ed., Sep. 1997, (see markup language), Mar. 1997.
Muralidharan, Baktha; IEEE Journal on Selected Areas in Communications; vol. 11, No. 9; Dec. 1993; pp. 1336–1345.

Primary Examiner—Zarni Maung
Assistant Examiner—Beatriz Prieto
Attorney, Agent, or Firm—Akin, Gump, Strauss, Hauer & Feld, LLP

[57] ABSTRACT

An event notification system for a network including a managed device that includes one or more management agents that detect one or more management events of a plurality of possible management events. The managed device further includes event notification logic that generates an event notification message (ENM) which includes event related information. The ENM is written using a markup language, such as XML, to encode the event related information based on the management event. The ENM may include executable code written in a scripting language or the like, that when executed, causes at least one action to be performed. A management server is provided that includes an event processor that executes the code to perform the desired actions in response to the particular management event. The event related information may further include a URL to locate one or more information files in the network that provides further information about the management event. The event notification logic transmits the ENM to the management server using an HTTP post transaction to ensure delivery.

21 Claims, 3 Drawing Sheets

MANAGEMENT EVENT NOTIFICATION SYSTEM USING EVENT NOTIFICATION MESSAGES WRITTEN USING A MARKUP LANGUAGE

FIELD OF THE INVENTION

The present invention relates to system and network management, and more particularly, to an improved system for providing notification of management events.

DESCRIPTION OF THE RELATED ART

In computer network environments, it is advantageous to manage the various software and hardware components coupled to the network from a central location or from a remote location. Such central or remote management of a network is commonly accomplished using industry standard protocols, such as the Simple Network Management Protocol (SNMP) or the Desktop Management Interface (DMI). Such traditional management systems utilize protocols that have been rigidly designed for delivering very specific management information. SNMP, for example, defines a protocol data unit known as a trap that is used to deliver event notification information. The format of the SNMP trap is narrowly defined. Additionally, SNMP delivers trap messages by use of User Datagram Protocol (UDP) which does not guarantee delivery of the message.

It is desired to provide a more flexible method of delivering notification and information of management events. It is also desired to ensure that an event notification gets delivered.

SUMMARY OF THE INVENTION

A managed device for a network that performs event notification according to the present invention includes at least one management event detector that detects at least one management event of a plurality of possible management events. The managed device further includes event notification logic that generates an event notification message (ENM) which includes event related information. In one embodiment, the ENM is written using a markup language to encode the event related information based on the particular management event that was detected. The event notification logic transmits the ENM onto the network to be received by a management device, such as a management server. The markup language may comprise the eXtended or extensible Markup Language (XML), which is a dialect of the Standardized General Markup Language (SGML). XML provides a meta language to define markup languages for specific applications. In this manner, a flexible and powerful method is provided to notify a management device and/or a system administrator of the management event.

For example, the ENM may include executable code that when executed causes at least one action to be performed. The executable code may be written in any manner, and may comprise an executable event action script written in a scripting language, such as JavaScript, Jscript, VBScript, Perl, etc. In one embodiment, the management server includes an event processor or processor logic that executes the code to perform the desired actions in response to the particular management event. In one embodiment, the ENM need not be written in a markup language but includes the executable code including instructions to execute one or more actions in response to the particular management event.

The event related information may further include a location pointer to locate further information on the network related to the particular management event that was detected. For example, the location pointer may comprises a universal resource locator (URL) or the like to locate an information file in the network. Preferably, the managed device includes communication logic that operates according to Transmission Control Protocol/Internet Protocol (TCP/IP). Also, the event notification logic formulates the ENM into an HyperText Transfer Protocol (HTTP) post transaction, that is transmitted on the network via the communication logic.

An event notification system according to the present invention includes a management server and a managed device that is communicatively coupled to the management server. The managed device includes the management event detector and the event notification logic that generates and transmits the ENM to the management server. The management server preferably includes an event processor that receives and parses the ENM. If the ENM includes executable code, the event processor executes the executable code to perform at least one action in response to the particular management event that was detected. The ENM may also include a URL or the like to locate a file in the network that provides further information related to the particular management event that was detected. The management server preferably includes a web server that communicates on the network according TCP/IP, and the managed device includes communication logic that communicates with the web server of the management server according to TCP/IP. The event notification logic formulates the ENM into an HTTP post transaction for transmitting the ENM to the management server.

It is appreciated that an event notification system according to the present invention provides an improved and enhanced ability to deliver event-related information of a managed device to a management server of a network. The use of a markup language, such as XML, for example, provides a flexible scheme for encoding management information in response to a management event. The content of the ENM is very flexible depending upon the particular management event that occurred. Executable code, for example, enables any one or more of a plurality of possible actions to be taken in response to the particular management event. A plurality of predefined code modules may be included on the managed device, each corresponding to one or more of the possible management events. A file locator enables the management server to locate more information related to the management event. Again, a plurality of predefined information files may be provided, each corresponding to one or more of the possible management events that may occur.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
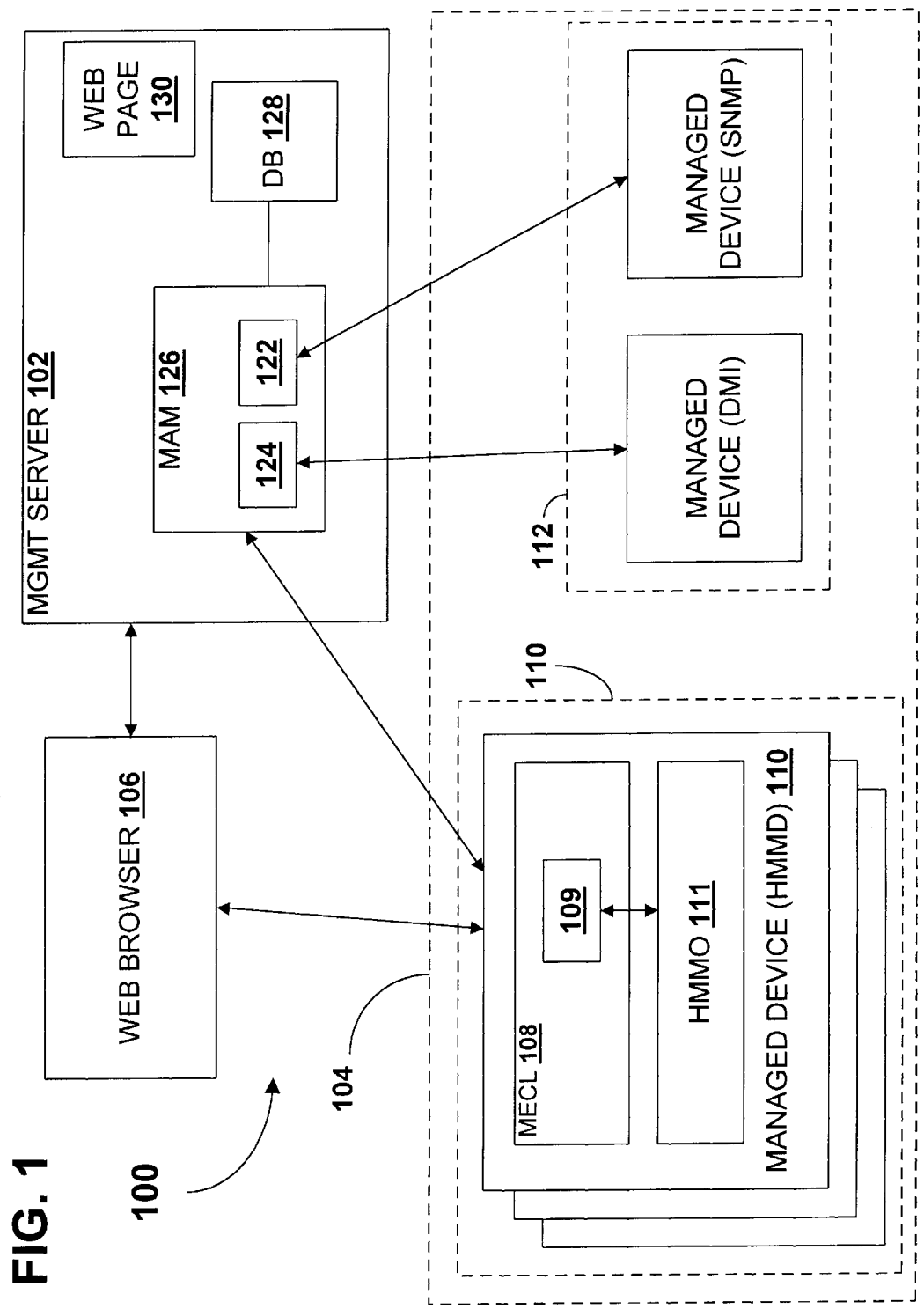
FIG. 1 is a block diagram of a web-based management network.

Referring now to FIG. 1, a block diagram of a web-based management network 100 is shown. A management system according to the present invention, such as the management network 100, enables management of both hardware and software components over a network using Internet technology. The management network 100 includes a management server 102, one or more managed elements 104, and a client system 106 that are coupled together using any one or more network architectures or technologies, such as Ethernet®, ATM, Token Ring, etc. The management network 100 preferably supports the World Wide Web (WWW), which is an Internet technology that is layered on top of the basic Transmission Control Protocol/Internet Protocol (TCP/IP) services. The management network 100 may be any type of network or network topology such as a separate intranet, part of the Internet itself, an intranet with access via a gateway or firewall to the Internet, etc.

The managed elements 104 generally include computer systems with one or more corresponding network interface cards (NICs) or the like, such as desktops, portables, personal computer systems (PCs), servers, workstations, etc. as well as other networking devices, such as switches, routers, repeaters, hubs, etc. The managed elements 104 are generally divided into two different types, including web-enabled devices or Hyper-Media Managed Devices (HMMDs) 110 and legacy devices 112. The legacy devices 112 include those devices implemented with the Simple Network Management Protocol (SNMP), the Desktop Management Interface (DMI), or similar type management systems known to those skilled in the art.

The HMMDs 110 each include one or more management agents called Hyper-Media Managed Objects (HMMO) 111, described further below. In the preferred embodiment, the HMMDs 110 each convert management data into a form that may be browsed using Internet technology, which may incorporate TCP/IP, Universal Resource Locator (URL), HyperText Transfer Protocol (HTTP), HyperText Markup Language (HTML), JavaScript, etc. A managed element communication layer (MECL) 108 including one or more servers 109 is provided at the front end of the HMMOs 111 for providing security of and access to management data of the corresponding HMMD 110. The servers 109 preferably operate as HTTP servers, and a separate server 109 is loaded and operated within the MECL 108 for each installed HMMO 111.

The client system 106 supports TCP/IP and includes a web browser for accessing and displaying management information from the management server 102 or any of the HMMDs 110. Examples of web browsers include MicroSoft® Internet Explorer for Windows 95® or Windows NT® and Netscape Navigator™ for Windows 95®, Windows NT® or HP/UX by Hewlett Packard. Other web browsers are contemplated as well. It is desired that the web browser support a scripting language, such as JavaScript, Jscript, VBScript, Perl, etc. Scripting language includes instructions interpreted by a browser to perform certain functions, such as how to display data. The client system 106 generally replaces the management console of an SNMP management system, providing access to either the HMMDs 110 or the management server 102.

The management server 102 preferably uses an appropriate operating system (OS) such as Windows NT® or the like. The management server 102 also executes or otherwise operates as a Hyper-Media Management Application (HMMA) that provides management services for all of the managed elements 104 including the HMMDs 110 and the legacy devices 112. The management server 102 may serve as the aggregation point for all management information of the management network 100 and provides a unified data model, in which data from the legacy devices 112 (SNMP, DMI, etc.) and data from the HMMDs 110 are consolidated into a common form. As such, the system and network management is unified and allows for easier integration and navigation between applications.

The management server 102 accesses management data from the HMMDs 110 and controls those devices using Internet technology. The HMMOs 111 may operate as self-describing web agents that use common web-enabling components to provide registration, discovery, security and HTTP communications. The HMMO web agents render information in HTML, or in scripting language, or a combination of both, for viewing by a browser on the client system 106. The information may also be sent directly to the management server 102. The management server 102 also converts data from the legacy devices 112 into a form that may be browsed. For example, the management server 102 includes an SNMP converter 122 that converts SNMP-based data from SNMP managed devices to HTML, and a DMI converter 124 that converts DMI-based data from DMI managed devices to HTML. The management data from the managed elements 104 is stored in a management database 128 maintained on the management server 102. The SNMP converter 122 and the DMI converter 124 are examples of management applications 126, which are plug-in modules used to perform the functions or otherwise expand the capabilities of the HMMA. In this manner, the management server 102 is adaptable and flexible depending upon specific embodiment needs. The management server 102 also generates a home page 130 accessible by any appropriate web browser, such as that executing on the client system 106 or on the management server 102 itself.

The management server 102 provides a management foundation, which includes discovery of manageable devices, performance of event management and determination of device status and device groups. The database 128 preferably includes events, discovered devices, device status, user preferences and user-specified data that is actively monitored. The management server 102 performs management services to discover managed elements 104 of the management network 100 and to track the device state of all of the managed elements 104. The management server 102 may discover devices on the network using IP pinging for IP devices, SAP broadcasts for Internetwork Packet Exchange (IPX) devices and is extendable to enable other discovery mechanisms. The management server 102 periodically collects and saves configuration information in the database 128 in a common form regardless of whether the information was originally web-based, SNMP or DMI. For example, the management server 102 stores events and traps, and enables configuration of filters that ultimately generate queries that are used to select records from the database 128. The management server 102 also enables access of the database 128. The database 128 is preferably based on SQL Server by Microsoft® and is accessed via Java™ DataBase Connectivity (JDBC) or Object DataBase Connectivity (ODBC). SQL views are created to abstract the database 128 for reporting purposes.

The management server 102 enables the user to select a managed element 104 and view detailed information about that device. The management server 102 also enables a user to create device groups for business process views by filtering for selected devices and for selected events of those devices. The management server 102 handles events, such as SNMP traps and HTTP alerts, logs the events and allows a user to set event filters.

As described previously, the client system 106 includes a web browser for accessing and displaying management information from the management server 102 and any of the HMMDs 110. For example, the client system 106 sends an HTTP request in URL format to an HMMD 110, which is received by the MECL 108 of that HMMD. The MECL 108 accesses an index page for the HMMD 110, or the request is transferred to one of the servers 109 for a corresponding one of the HMMOs 111. As further described below, each HMMO 111 formulates or renders a corresponding web page using HTML and/or scripting language, which is passed back to the client system 106 for rendering and display via the server 109 of the MECL 108. The client system 106 accesses the home page 130 or data from the database 128 in a similar manner using TCP/IP and another URL. The management server 102 also performs security functions as further described below.

It is noted that the legacy devices 112 are managed and controlled by the management server 102 as usual according to the particular protocol supported (SNMP, DMI), so that the client system 106 might not necessarily have direct access. Nonetheless, the client system 106 has access and control of the legacy devices 112 via the management server 102. In this manner, it is appreciated that the client system 106 may be located anywhere on the Internet to access and control all of the managed elements 104 of the management network 100.

One of the primary goals of the management network 100 is to ensure a continuous operation of the network with as little down time as possible by isolating and solving problems. The management server 102 provides the base for software modules to expose and present the solutions to problems that exist within the management network 100. The act of finding problems, reducing the complexity in analyzing or diagnosing problems, and helping to resolve problems is referred to as Action Oriented Management (AOM). AOM comprises several concepts, including discovering and defining a problem, determining the course of action(s) to take based on the problem, and providing the resolution to the problem, where the resolution may be performed either programmatically or by providing a list of steps for the user to follow.

There are many categories of actions that the management server 102 discovers. One action category is hardware fault detection, which is a category of actions identifying problems with hardware. Examples of hardware fault detection include failures or predictive failures on hard drives, processors, and memory. Most problem resolutions in the hardware fault detection category are simply identified steps that the user must follow to correct the problem. Tools in this category allow viewing of the problem. Another action is software configuration actions, which are actions that identify potential problems with software configurations. Software configuration actions use version control functionality along with the concept of a "software set". The user establishes a set of software that should be loaded on a server, and this category of actions identifies any deviations from that set, and differences between the set and the latest software. Problem resolution for software configuration allows distribution of software updates, along with retrieval of new software. Tools in this category include software distribution, Internet download, and report generation.

Another action category is thresholds, which are actions that track situations on the network identified by combinations of data. The user has to configure the situations. The threshold tools allow the user to monitor management data and be notified whenever certain conditions arise. Another action category is action advisories, which are actions that notify the user whenever an event is needed to be performed, such as service advisories generated by the manufacturer of the management server 102. Other advisory examples include backups, disk storage cleanup, etc. Tools for this category provide the details of the action advisory and may allow corrective action. Another action category is software updates, which are actions that notify the user whenever a new software update to software on their network becomes available on a corresponding web site. Tools for this category allow the new update to be fetched from servers setup on a user's network. Another action category is traps, which are actions that occur when an SNMP trap, an HTTP event, a DMI indication, or similar types of traps or events is received. The trap is turned into an action that is operated on just as any other action. The tools in this category allow the user to forward the trap to other management consoles, to page the user, provide correlation, etc.

In general, management is often classified by what is being managed: Hardware, Operating System, Software, etc. The following Table 1 illustrates the layers and the management data that is typical of that layer. It is noted that Table 1 is by no means exhaustive and simply provides typical management data for the corresponding layer.

TABLE 1

Management Layers and Corresponding Typical Management Data

| Managed Layer | Examples of managed data at each layer |
| --- | --- |
| Applications (highest layer) (Vertical, specialized applications) Databases, web servers, So-called "Horizontal" applications | Transactions per second Application specific data, such as status of batch processing activities Table space used Number of locks set Resources used - percent of system work areas, etc. |
| Operating System | Number of processes Interrupts per second being serviced Per cent of CPU time spent in user state Names of processes |
| Hardware (lowest layer) | Configuration: serial number of disk drive, bytes of RAM installed, etc. Operational: number of bytes sent by Ethernet controller, number of packet collisions on Ethernet, temperature of CPU cabinet, etc. |

Figure 2:
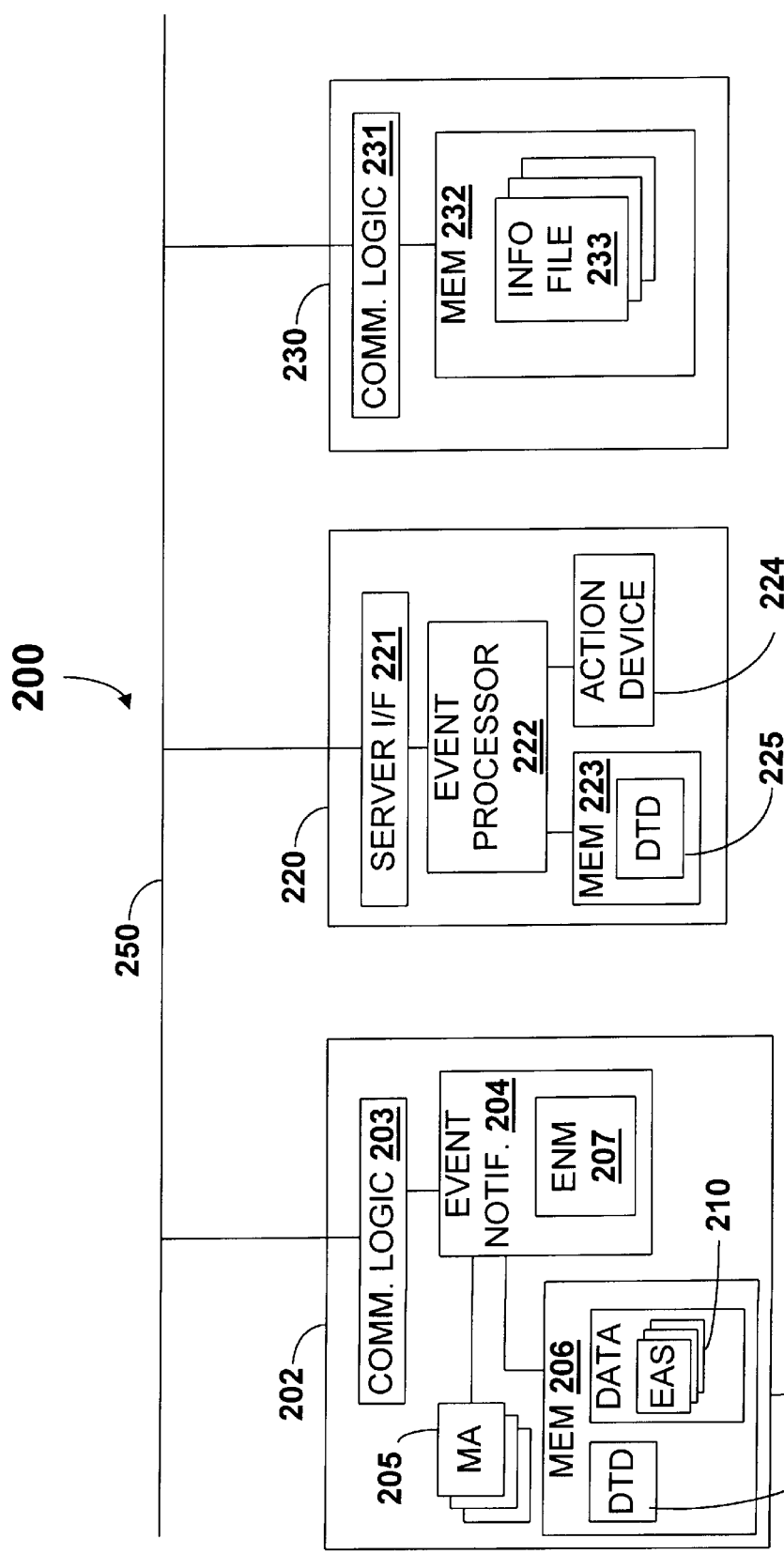
FIG. 2 is a block diagram illustrating a network system including a managed device and management server that each perform event notification according to the present invention.

Referring now to FIG. 2, a block diagram is shown of a network system 200 including an event notification system according to the present invention. A managed device 202 and a management server 220 are coupled to a network 250. The managed device 202 may be implemented in a similar manner as any of the managed devices previously described, including the HMMDs 110 or the legacy devices 112, and may comprise any type of computer with one or more NICs, such as a server, desktop, portable, PC, workstation etc., or any type of system device or any type of network device, such as a router, switch, repeater, hub, etc. The management server 220 may be implemented in any desired manner and may be similar to the management server 102 previously described, and also may comprise any type of computer with one or more NICs, such as a server, desktop, portable, PC, workstation etc., or any type of system device or any type of network device, such as a router, switch, repeater, hub, etc.

The managed device 202 and the management server 220 are communicatively coupled to the network 250 in any desired manner depending upon the type of media and architecture or technology, such as Ethernet®, ATM, Token Ring, etc. Wireless network communication is also contemplated. The network system 200 preferably supports the World Wide Web (WWW) and TCP/IP services including HTML, HTTP, etc. The network system 200 may be implemented according to any type of network or network topology such as a separate intranet, part of the Internet itself, an intranet with access via a gateway or firewall to the Internet, etc.

The managed device 202 includes communication logic 203 communicatively coupled to the network 250 for sending and receiving information according to any desired format or protocol, such as IP packets or the like, via the network 250. The communication logic 203 may be implemented according to TCP/IP, for example, and thus may comprise a TCP/IP protocol stack for sending and receiving IP packets according to HTTP or the like. The communication logic 203 is coupled to an event notification module 204, which is further coupled to one or more management agents (MA) 205 and a memory 206. The event notification module 204 assembles an event notification message (ENM) 207 in response to one or more management events indicated by any one or more of the management agents 205, and transports the ENM 207, via the communication logic 203, to a device on the network 250, such as the management server 220.

The management agents 205 are implemented to detect any one or more of a plurality of management events that may occur on the managed device 202, including asynchronous management events. Each management agent 205 may include, for example, instrumentation code and a management communication layer (not shown). The management communication layer is responsible for understanding a management protocol, such as any one of the traditional protocols including SNMP, DMI, etc., or any other management protocol including HTTP-based communication as described herein. The management communication layer calls the instrumentation code to acquire data or to perform management control operations. The function and implementation of instrumentation code varies widely depending the hardware and software environment and on the level of management data. Several levels of management data are described in Table 1 above, including, but not limited to, hardware, the operating system (OS), software applications, etc.

As an example of acquiring hardware management data, a hardware management agent 205 includes instrumentation code that is used to execute input and output instructions in order to acquire information that describes the physical memory modules installed on a system board of a computer system. As an example of acquiring operating system management data, an OS management agent 205 includes instrumentation code that is used to execute instructions to access Windows NT's perfmon (performance monitor) counters to determine how many interrupts per second are being serviced by a CPU. Another role performed by instrumentation code of a management agent 205 is to execute control operations to effect management operations. An example of a control operation is to reboot a system or terminate a failed process. Although the management agents 205 may be implemented as code modules comprising software in a given implementation, the present invention is not limited to any particular implementation of management data collection system, and may comprise hardware, firmware, software, or any combination thereof.

The management server includes a server interface (I/F) 221 that is communicatively coupled to the network 250 for sending and receiving information according to any desired format or protocol, such as IP packets or the like, via the network 250. The server I/F 221 may be implemented according to TCP/IP, for example, and may comprise a web server. The communication logic 203 communicates with the server I/F 221 in any desired manner, such as according to the HTTP protocol or the like. For HTTP, which is an extendible, general protocol that is layered on top of the TCP protocol layer, the communication logic 203 operates as an HTTP client and the server I/F 220 comprises a web server that supports the HTTP protocol. Event processor logic 222 is coupled to the server I/F 221. A memory 223 and an action device 224 are each coupled to the event processor logic 222. The event processor logic 222 may be implemented as a web server back end process such as the Common Gateway Interface (CGI), the Internet Server Application Programming Interface (ISAPI) standard, the Netscape Server API (NSAPI) or any other suitable back end process. As a result, the communication is platform independent.

The event processor logic 222 receives and processes the ENM 207 sent by the managed device 202 via the network 250. The ENM 207 may include executable code executed by the event processor logic 222 to perform one or more functions or to take one or more actions. One such action may involve the action device 224, which may comprise a software module, a hardware module or a combination of both to perform an action in response to the event indicated by the ENM 207. For example, the action device 224 may be implemented to make a phone call or send a page to a system administrator to inform the system administrator of a management event indicated by the ENM 207.

The ENM 207 may also include a location pointer to a file located at the management server 220 or anywhere on the network 250. An information device 230, such as any type of computer system or the like, may further be included in the network system 200 and communicatively coupled to the network 250. The information device 230 also includes communication logic 231 for communicating on the network 250 and a memory 232 coupled to the communication logic 231. The memory 232 includes one or more information files 233 that are identified and/or located using the location pointer. The information files 233 may be written in any compatible manner for retrieval by the management server 220, such as HTML files or the like. For example, the location pointer may comprise a URL that enables the management server 220 to locate and retrieve one or more of the information files 233 from the information device 230. Each of the information files 233 includes further information associated with the particular event indicated by the ENM 207 from the managed device 202.

In this manner, the event notification module 204 provides notification of one or more management events and specifies the appropriate actions that should be taken when the management event(s) occur. Such management events are often asynchronous in that they may not occur at specific periods or times. The event notification module 204 delivers notification of the asynchronous management event to an appropriate device, such as the management server 220. The basic delivery mechanism used for event notification may be according to any appropriate protocol, such as the HTTP protocol. In one embodiment, an HTTP post transaction is utilized for delivery of an event notification message. The Event Notification Message, or ENM 207, contains information that describes the management event and any actions required by the event. The ENM 207 is formulated based upon the particular event that occurred as reported by any one of the MAs 205. The memory 206 may include one or more data files 209 that are used to formulate the contents of the particular ENM 207 based upon the particular management event.

In one embodiment, the ENM 207 is encoded in the extensible Markup Language (XML), which is a dialect of the Standardized General Markup Language (SGML). XML provides a meta language to define markup languages for specific applications. XML is an open standard in the computing industry and may be used to define Channel Definition Format (CDF) files and Open Software Description (OSD) files. A Document Type Declaration (DTD) may be used to describe the structure of an XML document. The memory 206 may include a DTD 208, which is used by the event notification module 204 to formulate the ENM 207. The memory 223 of the management server 220 may include a corresponding DTD 225 to interpret the ENM 207 including an XML document.

Preferably, any XML documents used in the ENM 207 should be "well formed" and may even be "valid", where the terms "well formed" and "valid" are XML specific terminology. A valid XML document is one that has been validated by parsing the XML document and comparing it with the DTD 225. A well formed XML document is one that follows the standard XML syntax but has not been compared to a DTD, or a DTD may not exist. The DTD 208, 225 allows a user of XML to optionally constrain the contents and structure of an XML document. In the well formed case, additional tags may be included to add information that was not anticipated when the initial set of XML tags was devised for an application that is using XML.

An exemplary DTD is as follows, where it is understood that the DTD, if used, may be defined in any manner depending upon the particular implementation:

```
<!DOCTYPE DOCUMENT [
<!ELEMENT DOCUMENT (EVENT)+>
<!ELEMENT EVENT (DEVICEID, IPADDRESS, EVENTSEV,
EVENTTIME, EVENTCODE, DEVICENAME, DESCRIPTION?,
TRANSACTION_NO, EVENTACTIONSCRIPT?,
EVENTURL?)>
<!ELEMENT DEVICEID (#PCDATA)>
<!ELEMENT IPADDRESS (#PCDATA)>
<!ELEMENT EVENTSEV (#PCDATA)>
<!ELEMENT EVENTTIME (#PCDATA)>
<!ELEMENT EVENTCODE (#PCDATA)>
<!ELEMENT DEVICENAME (#PCDATA)>
<!ELEMENT DESCRIPTION (#PCDATA)>
<!ELEMENT TRANSACTION_NO (#PCDATA)>
<!ELEMENT EVENTACTIONSCRIPT (#PCDATA)>
<!ELEMENT EVENTURL (#PCDATA)>
]>
``` where DEVICEID is a unique identifier of the managed device 202, such as a Universally Unique Identifier (UUID) or the like, IPADDRESS is an Internet Protocol (IP) address of the managed device 202, EVENTSEV is an indication of the severity of the managed event, EVENTTIME identifies the time at which the management event occurred, EVENTCODE defines a code that specifies the particular event, DEVICENAME is a name of the managed device 202, DESCRIPTION comprises a prose description of the event, TRANSACTION_NO is a sequence number assigned to the management event by the managed device 202, EVENTACTIONSCRIPT comprises executable code, such as, for example, executable script written in a scripting language, and EVENTURL is a field that specifies a URL that may be accessed to view additional information about the management event. The executable script may comprise any type of code or script language, such as JavaScript, VBScript, Perl, etc. or any other type of code or interpretive script language that is interpreted or executed by the event processor logic 222 of the management server 220 to perform whatever action that may be desired upon receipt of the ENM 207.

Figure 3:
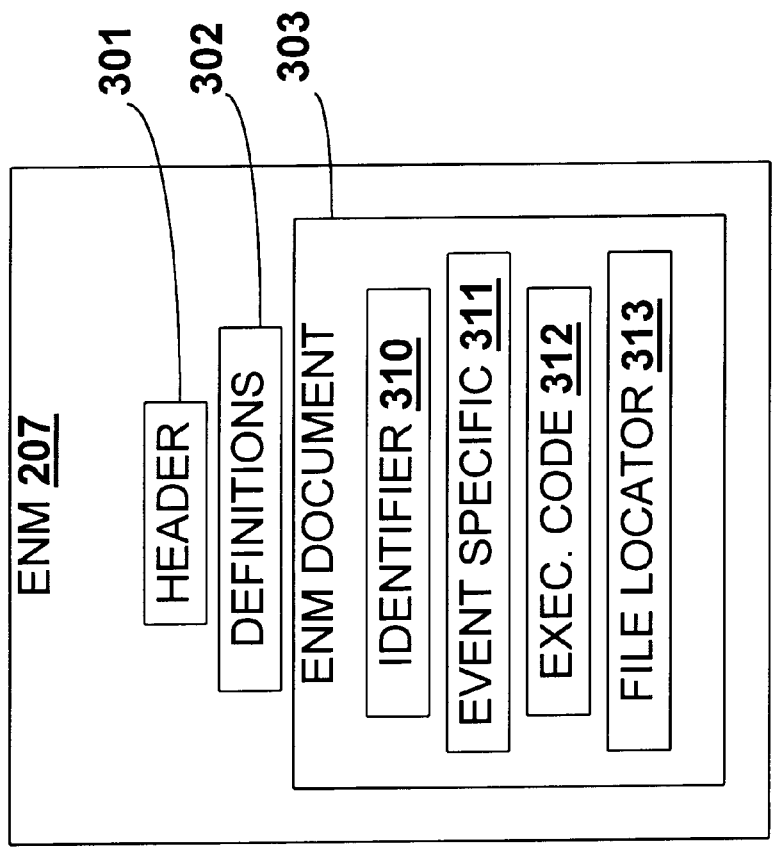
FIG. 3 is a block diagram illustrating an exemplary event notification message formulated by the managed device for sending to the management server of FIG. 2.

FIG. 3 is a block diagram illustrating an exemplary ENM 207 formulated by the managed device 202 for sending to the management server 220 via the network 250. The ENM 207 may include a header 301 for the particular type of communication packet sent on the network 250, such as an HTTP header. The ENM 207 may include a definitions section 302 for describing the host, such as the management server 220, the type of language included in the packet, the character set used, the content type included, such as XML or the like, the content length of the packet, etc. The ENM 207 may also include an ENM document 303 for including more specific information about the managed device in which the management event occurred, and information about the management event itself. The ENM document 303 includes, for example, an identifier section 310 of the managed device 202, an event specific information section 311, executable code 312 that includes executable code or scripting language for execution by the event processor logic 222 of the management server 220, and an event file locator 313, such as a URL or the like, to locate an information file in the network 200 that provides more information about the particular management event.

An exemplary ENM 207 that may be transmitted to the management server 220 in an HTTP post transaction is as follows:

```
POST POST /EventListener HTTP/1.0<cr><ln> Start of
HTTP POST transaction
Host: ManagementServer.domain.com
(the management server 220, for example)
Accept-Language: en<cr><ln>
Accept-Charset: iso-8859-1, *, utf-8<cr><ln>
Content-Type: x-event/XML <cr><ln>
Content-length: nnn<cr><ln>
<cr><ln>
<?XML version = "1.0"?>      First line of the XML document
<DOCUMENT>
<EVENT     (the ENM document)
    <DEVICEID>UUID</DEVICEID>
    <IPADDRESS>255.255.255.255</IPADDRESS>
    <EVENTSEV>CRITICAL</EVENTSEV>
    <EVENTTIME>Tue, 21 Jan 1998 08:21:32 GMT</EVENTTIME>
    <EVENTCODE>234</EVENTCODE>
    <DEVICENAME>BIGSERVER</DEVICENAME>
    <DESCRIPTION>Processor thermal event</DESCRIPTION>
    <TRANSACTION_NO>11111 </TRANSACTION_NO>
    <EVENTACTIONSCRIPT></EVENTACTIONSCRIPT>
    <EVENTURL></EVENTURL>
</EVENT>
</DOCUMENT>
``` where the HTTP post transaction includes an ENM document including the same or similar parameters as the DTD described above and which are defined in a similar manner: DEVICEID, IPADDRESS, EVENTSEV, EVENTTIME, EVENTCODE, DEVICENAME, TRANSACTION_NO, EVENTACTION-SCRIPT and EVENTURL. In the above exemplary case, the management event is a processor thermal event (DESCRIPTION), such as a processor or CPU of the managed device 202 reaching a predetermined high temperature, which is considered a critical event (EVENTSEV=CRITICAL). It is noted that the any of the fields may be null if they are not used in the event. The DTD for the ENM may specify that any one or more of the fields are optional.

The executable code 312 may include an Event Action Script (EAS), which is an executable script that is to be executed by the target of the ENM 207, such as the management server 220. The data file(s) 209, for example, may include a plurality of EAS files 210, each corresponding to one or more of a plurality of possible management events that may occur on the managed device 202. Each EAS file 210 defines one or more actions, encoded in a scripting language such as Jscript, VBScript, Perl, or other scripting language, that should be taken in response to a corresponding management event. An EAS allows the event originator to specify the actions that should be taken by the target of the ENM. An exemplary EAS written in JavaScript for sending an alphanumeric page to a system administrator, for example, is as follows:

a wide variety of tasks. In effect, it allows the originator of the management event to send executable code that is to be executed by the receiver of the event. The receiver preferably includes the means to carry out the actions defined by the EAS. For example, the management server 220 includes the event processor logic 222 that instructs the action device 224 to carry out any one or more actions that are specified. Of course, any number of action devices or modules may be included to carry out any possible actions desired to be taken

```
<SCRIPT LANGUAGE="JavaScript">
>!-
// Send an alphnumeric page
// This code assumes that this script is executing in an environment in which
// the event XML object has been parsed and the constituent tagged fields can be
// accessed
var eventdoc = new object(xml);
// gain access to fields this function call creates a new object that can be
used to access the parsed
// contents of the fields of this ENM
var msg = "At time" + eventdoc.EVENTTIME
msg = msg + "server LONGHOUSE is shutting down due to a processor thermal event";
// send the page
SendAlphaPage(msg);
//-->
</SCRIPT>
```

It is appreciated that the EAS is a very general and powerful facility. It allows the originator of the ENM, such as the managed device 202 to direct the receiving agent, such as an agent on the management server 220, to perform in response to the plurality of possible management events that could occur on the managed device 202.

An example of an EAS that is embedded in an ENM is as follows:

```
POST POST /EventListener   HTTP/1.0<cr><in>         Start of HTTP POST transaction
Host: ManagementServer.domain.com
Accept-Language: en<cr><in>
Accept-Charset: iso-8859-1, *, utf-8<cr><ln>
Content-Type: x-event/XML<cr><in>
Content-length: nnn<cr><in>
<cr><in>
<?XML version = "1.0"?>                              First line of the XML document
<DOCUMENT>
<EVENT
    <DEVICEID>UUID</DEVICEID>
    <IPADDRESS>255.255.255.255</IPADDRESS>
    <EVENTSEV>CRITICAL</EVENTSEV>
    <EVENTTIME>Tue, 21 Jan 1998 08:21:32 GMT</EVENTTIME>
    <EVENTCODE>234</EVENTCODE>
    <DEVICENAME>LONGHOUSE</DEVICENAME>
    <DESCRIPTION>Processor thermal event</DESCRIPTION>
    <TRANSACTION_NO>22222</TRANSACTION_NO>
<EVENTACTIONSCRIPT>
<SCRIPT LANGUAGE = "JavaScript">
<!-
// Send an alphnumeric page
// This code assumes that this script is executing in an environment in which
// the event XML object has been parsed and the constituent tagged fields can be
// accessed
var eventdoc = new object(xml); // gain access to fields
var msg = "At time" + eventdoc.EVENTTIME
msg = msg + "server LONGHOUSE is shutting down due to a processor thermal event";
// send the page
SendAlphaPage(msg);
//->
</SCRIPT>
</EVENTACTIONSCRIPT>
<EVENTURL></EVENTURL>
</EVENT>
</DOCUMENT>
```

The file locator 313 is provided to locate any file in the network 250 that includes further information about the particular management event the occurred on the managed device 202. A plurality of such files may be provided, such as the information files 233, each corresponding to one or more of the possible management events. An exemplary HTTP post transaction including the EVENTURL field is as follows:

---

```
POST POST /EventListener    HTTP/1.0<cr><ln>        Start of HTTP POST transaction
Host: ManagementServer.domain.com
Accept-Language: en<cr><ln>
Accept-Charset: iso-8859-1, *, utf-8<cr><ln>
Content-Type: x-event/XML<cr><ln>
Content-length: nnn<cr><ln>
<cr><ln>
<?XML version = "1.0"?>                             First line of the XML document
<DOCUMENT>
<EVENT
    <DEVICEID>UUID</DEVICEID>
    <IPADDRESS>255.255.255.255</IPADDRESS>
    <EVENTSEV>CRITICAL</EVENTSEV>
    <EVENTTIME>Tue, 21 Jan 1998 08:21:32 GMT</EVENTTIME>
    <EVENTCODE>234</EVENTCODE>
    <DEVICENAME>ACCTSERVER</DEVICENAME>
    <DESCRIPTION>System degraded</DESCRIPTION>
    <TRANSACTION_NO>33333</TRANSACTION_NO>
    <EVENTURL>acctserver.acme.com/disksubsys:2301 </EVENTURL>
</EVENT>
</DOCUMENT>
```

--- where the receiver of the event is supplied with a URL "acctserver.acme.com/disksubsys:2301" that is used to access additional information about the event, such as any of the information files 233. Typically, the URL would be displayed by the management server 220 along with other event information so that the person accessing the event information could use a browser, such as the web browser 106, to access the additional event information.

The event processor logic 222 performs several functions, including waiting for an ENM 207, parsing the ENM 207 when received, storing the various objects or elements of the ENM 207, executing any executable code in the ENM 207, if supplied, or retrieving a document using a file location pointer or URL, if supplied. Parsing may comprise parsing the ENM 207 packet into an object tree representation to enable access to the various elements of an included XML object.

Optionally, the ENM 207 may be compressed using any one or more of a number of different compression algorithms. This may be accomplished in a flexible manner in an HTTP message body described by use of a Multipurpose Internet Mail Extension (MIME)-type tag or descriptor. For example, the content-type may specify a compression method: x-event/compressed-method-1. Also, the ENM 207 may be encrypted using any one or more of a number of different encryption algorithms. Here again, this is accomplished in a flexible manner in an HTTP message body containing the ENM that is described by use of a MIME-type tag. For example, the content-type may specify an encryption method: Content-type: x-event/encrypted-method-1.

It is now appreciated that an event notification system according to the present invention provides an improved and enhanced ability to deliver event-related information of a managed device to a management device on a network, such as a management server. The use of a markup language, such as XML, for example, provides a flexible scheme for encoding management information in response to a management event. A managed device includes event notification logic that formulates an event notification message (ENM) in response to one of a plurality of management events. The content of the ENM is very flexible depending upon the particular management event that occurred.

For example, executable code may be inserted into the ENM. When the code is executed by an event processor of the management server, the code instructs the management server to take one or more appropriate actions in response to the management event. A plurality of predefined executable code modules may be written, each corresponding to one or more of the possible management events that may occur. Also, a file locator or pointer may be inserted into the ENM to enable the management server to locate more information related to the management event. Again, a plurality of information files may be provided, each corresponding to one or more of the possible management events that may occur.

The ENM may be sent across the network according to any particular protocol that is supported by the network architecture. In one embodiment, the network supports TCP/IP and HTTP, where the ENM may be formulated into an HTTP post transaction. The use of HTTP provides for guaranteed delivery of the ENM.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended.

We claim:

1. A managed device for a network that performs event notification, comprising:

at least one management event detector that detects at least one management event of a plurality of possible management events;

event notification logic that generates an event notification message that includes event related information, the event notification logic transmitting the event notification message onto the network; and the event notification message written using a markup language to encode the event related information based on the particular management event that was detected.

2. The managed device of claim 1, wherein the markup language comprises an extensible markup language.

3. The managed device of claim 1, further comprising:

the event notification message including executable code that when executed causes at least one action to be performed.

4. The managed device of claim 3, further comprising:

the executable code comprising an executable event action script written in a scripting language.

5. The managed device of claim 1, further comprising:

the event related information including a location pointer to locate further information on the network related to the particular management event that was detected.

6. The managed device of claim 5, wherein the location pointer comprises a universal resource locator to locate an information file in the network.

7. The managed device of claim 1, further comprising:

communication logic that operates according to Transmission Control Protocol/Internet Protocol (TCP/IP).

8. The managed device of claim 7, further comprising:

the event notification logic formulating the event notification message into an HyperText Transfer Protocol (HTTP) post transaction for transmitting on the network via the communication logic.

9. A managed device for a network that performs event notification, comprising:

at least one management event detector that detects at least one management event of a plurality of possible management events;

event notification logic that generates an event notification message that includes event related information, the event notification logic transmitting the event notification message onto the network; and the event notification message including executable code that when executed instructs at least one action to be performed in response to the particular management event that was detected.

10. The managed device of claim 9, further comprising:

the event notification message written using a markup language to encode the event related information based on the particular management event that was detected.

11. The managed device of claim 9, further comprising:

the event notification message including a location pointer to locate further information on the network related to the particular management event that was detected.

12. The managed device of claim 11, wherein the location pointer comprises a universal resource locator to locate an information file in the network.

13. The managed device of claim 9, further comprising:

communication logic that operates according to Transmission Control Protocol/Internet Protocol (TCP/IP).

14. The managed device of claim 13, further comprising:

the event notification logic formulating the event notification message into an HyperText Transfer Protocol (HTTP) post transaction for transmitting on the network via the communication logic.

15. An event notification system, comprising:

a management server; and a managed device that is communicatively coupled to the management server, the managed device comprising:

at least one management event detector that detects at least one management event of a plurality of possible management events;

event notification logic that generates an event notification message that includes event related information, the event notification logic transmitting the event notification message to the management server; and the event notification message written using a markup language to encode the event related information based on the particular management event that was detected.

16. The event notification system of claim 15, wherein the markup language comprises an extensible markup language.

17. The event notification system of claim 15, further comprising:

the event notification message including executable code to perform at least one action.

18. The event notification system of claim 17, further comprising:

the management server including an event processor that receives and parses the event notification message and that executes the executable code to perform at least one action in response to the particular management event that was detected.

19. The event notification system of claim 15, wherein the event related information includes a universal resource locator to locate a file in the network that provides further information related to the particular management event that was detected.

20. The event notification system of claim 15, further comprising:

the management server including a web server that communicates on the network according to Transmission Control Protocol/Internet Protocol (TCP/IP); and the managed device including communication logic that communicates with the web server of the management server according to TCP/IP.

21. The event notification system of claim 20, further comprising:

the event notification logic formulating the event notification message into an HyperText Transfer Protocol (HTTP) post transaction for transmitting to the management server.

* * * * *